US010198128B2

(12) United States Patent
Lim et al.

(10) Patent No.: US 10,198,128 B2
(45) Date of Patent: Feb. 5, 2019

(54) DISPLAY APPARATUS INCLUDING CAPPING LAYERS HAVING DIFFERENT PROPERTIES

(71) Applicant: SAMSUNG DISPLAY CO., LTD., Yongin-si, Gyeonggi-Do (KR)

(72) Inventors: Jaeik Lim, Yongin-si (KR); Jinwoo Choi, Yongin-si (KR); Wonsang Park, Yongin-si (KR); Insun Hwang, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/440,545

(22) Filed: Feb. 23, 2017

(65) Prior Publication Data
US 2017/0242549 A1    Aug. 24, 2017

(30) Foreign Application Priority Data
Feb. 23, 2016    (KR) .................. 10-2016-0021315

(51) Int. Cl.
*G06F 3/041*    (2006.01)
*G06F 3/042*    (2006.01)
*G06K 9/00*    (2006.01)

(52) U.S. Cl.
CPC .......... *G06F 3/0421* (2013.01); *G06F 3/0412* (2013.01); *G06F 3/0416* (2013.01); *G06K 9/00013* (2013.01)

(58) Field of Classification Search
CPC .... G06F 3/0412; G06F 3/0416; G06F 3/0421; G06K 9/00013
See application file for complete search history.

(56) References Cited

U.S. PATENT DOCUMENTS

| 6,872,635 | B2 | 3/2005 | Hayashi et al. |
| 2006/0227085 | A1 | 10/2006 | Boldt, Jr. et al. |
| 2010/0327764 | A1 | 12/2010 | Knapp |
| 2012/0074391 | A1 | 3/2012 | Sumida et al. |
| 2014/0145939 | A1 | 5/2014 | Herold et al. |
| 2014/0159067 | A1 | 6/2014 | Sakariya et al. |
| 2014/0312325 | A1 | 10/2014 | Jang et al. |
| 2015/0187847 | A1* | 7/2015 | Choi .................. H01L 27/3211 257/40 |

(Continued)

FOREIGN PATENT DOCUMENTS

| JP | 10-241610 | 9/1998 |
| JP | 2002-314052 | 10/2002 |
| JP | 2012-89474 | 5/2012 |

(Continued)

*Primary Examiner* — Laurence J Lee
(74) *Attorney, Agent, or Firm* — F. Chau & Associates, LLC

(57) ABSTRACT

A display apparatus includes a substrate; a plurality of light-emitting diodes (LED) disposed on the substrate, and a capping layer on each LED. Each LED emits one of a first light having a first wavelength, a second light having a second wavelength, and a third light having a third wavelength, where the first wavelength is less than the second wavelength, and the second wavelength is less than the third wavelength. Each capping layer has a different haze value for each of the first, second and third lights, or a different lens shape for each of the first, second and third lights.

20 Claims, 11 Drawing Sheets

(56) References Cited

U.S. PATENT DOCUMENTS

2015/0294108 A1 10/2015 Kim et al.
2015/0309660 A1 10/2015 Lee et al.

FOREIGN PATENT DOCUMENTS

| JP | 2013-501258 | 1/2013 |
| JP | 2013-120731 | 6/2013 |
| KR | 10-2006-0012276 | 2/2006 |
| KR | 10-2014-0037861 | 3/2014 |
| KR | 10-2014-0124615 | 10/2014 |
| KR | 10-2015-0117543 | 10/2015 |
| KR | 10-2015-0122529 | 11/2015 |

* cited by examiner

DISPLAY APPARATUS INCLUDING CAPPING LAYERS HAVING DIFFERENT PROPERTIES

CROSS-REFERENCE TO RELATED APPLICATION

This application claims priority under 35 USC § 119 from, and the benefit of, Korean Patent Application No. 10-2016-0021315, filed on Feb. 23, 2016 in the Korean Intellectual Property Office, the contents of which are herein incorporated by reference in their entirety.

BACKGROUND

1. Technical Field

One or more embodiments are directed to a display apparatus, and more particularly, to a display apparatus that can improve the color sense of a realized image.

2. Discussion of the Related Art

In general, a light-emitting diode (LED) is a device that converts an electric signal into light, such as infrared light, visual light, etc., by using characteristics of a compound semiconductor, and is used in home appliances, remote controls, electronic display boards, various types of automation devices, etc. LEDs are becoming more widely used, for example, the LED is widely used in electronic devices from small hand-held electronic devices to large display apparatuses.

SUMMARY

One or more embodiments include a display apparatus that can decrease a white light shift.

One or more embodiments include a display apparatus that includes, in a display portion, a photodetector that detects light.

Additional aspects will be set forth in part in the description which follows and, in part, will be apparent from the description, or may be learned by practice of the presented embodiments.

According to one or more embodiments, a display apparatus includes: a substrate; a first light-emitting diode (LED) disposed on the substrate that emits a first light; a second LED disposed on the substrate that emits a second light; a first capping layer disposed on the first LED; and a second capping layer disposed on the second LED that has optical characteristics that differ from those of the first capping layer.

A material of the first capping layer may differ from a material of the second capping layer.

A haze value of the first capping layer may differ from a haze value of the second capping layer. When a wavelength of the first light is longer than that of the second light, the haze value of the first capping layer may be greater than the haze value of the second capping layer.

A refractive index of the first capping layer may differ from a refractive index of the second capping layer. When a wavelength of the first light is longer than that of the second light, the refractive index of the first capping layer may be greater than the refractive index of the second capping layer.

One of the first capping layer and the second capping layer may have a lens shape, and the other may have a cylindrical shape.

The first capping layer and the second capping layer may have lens shapes, and a radius of curvature of the first capping layer may differ from a radius of curvature of the second capping layer. When a wavelength of the first light is longer than that of the second light, the radius of curvature of the first capping layer may be greater than the radius of curvature of the second capping layer.

The first light has a different wavelength from the second light

The first light may be visible light, and the second light may be invisible light.

The display apparatus may further include a photodetector disposed on the substrate between the first LED and the second LED that detects at least one selected from the first light and the second light.

The photodetector may include a photodiode.

The display apparatus may further include a controller that controls an amount of light emitted from at least one of the first and second LEDs based on a result received from the photodetector.

The display apparatus may further include a controller that senses at least one of a touch by a user, a fingerprint of the user, and veins of the user, by using a result received from the photodetector.

According to one or more embodiments, a display apparatus includes a substrate; a plurality of light-emitting diodes (LED) disposed in a matrix on the substrate, where each LED emits one of a first light having a first wavelength, a second light having a second wavelength, and a third light having a third wavelength, where the first wavelength is less than the second wavelength, and the second wavelength is less than the third wavelength; and a plurality of capping layers, wherein a capping layer is disposed on each LED and the capping layers have different optical characteristics for each of the first, second and third light.

Each capping layer may have a haze value, and the haze value for an LED emitting a longer wavelength light may be greater than the haze value for an LED emitting a shorter wavelength light.

Each capping layer has a refractive index, and the refractive index for an LED emitting a longer wavelength light may be greater than the refractive index for an LED emitting a shorter wavelength light.

Each capping layer has a lens shape, and a radius of curvature for an LED emitting a longer wavelength light is greater than the radius of curvature for an LED emitting a shorter wavelength light.

At least one of the plurality of LED may emit infrared light, and the capping layer for an LED that emits infrared light may be made of a different material than the capping layers for LEDs that emit one of the first, second and third light, and may have a cylindrical shape with a flat upper surface.

The display apparatus may further include a photodetector disposed on the substrate among the plurality of LEDs arranged in a matrix that may detect at least one selected from the first light, the second light, and the third light, and a controller that may control an amount of light emitted from at least one of the plurality of LEDs based on a result received from the photodetector.

The photodetector may be a photodiode.

The display apparatus may further include a controller that may sense at least one of a touch by a user, a fingerprint of the user, and veins of the user, by using a result received from the photodetector.

DETAILED DESCRIPTION

Figure 1:
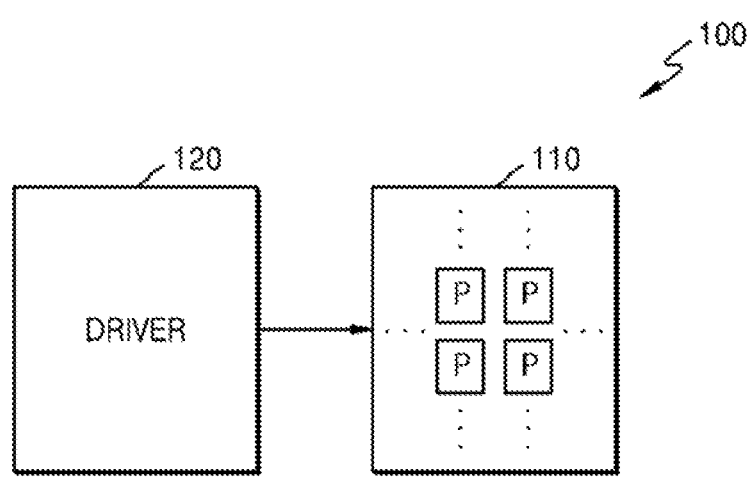
FIG. 1 is a schematic plan view of a display apparatus according to an embodiment.

As exemplary embodiments may have various changes or modifications, certain embodiments will be illustrated in the drawings and will be described in detail in the written description. Exemplary embodiments may, however, be embodied in many different forms and should not be construed as being limited to the embodiments set forth herein.

Reference will now be made in detail to embodiments, examples of which are illustrated in the accompanying drawings. In the drawings, the same elements may be denoted by the same reference numerals, and repeated descriptions thereof are omitted.

It will be further understood that the terms "include," "comprise" and/or "have" used herein specify the presence of stated features or elements, but do not preclude the presence or addition of one or more other features or elements.

It will be understood that when a layer, region, or element is referred to as being "formed on", another layer, region, or element, it can be directly or indirectly formed on the other layer, region, or element.

Sizes of elements may be exaggerated for convenience of explanation.

FIG. 1 is a schematic plan view of a display apparatus 100 according to an embodiment.

Referring to FIG. 1, according to an embodiment, the display apparatus 100 includes a display portion 110 and a driver 120. The display portion 110 includes a plurality of pixels P that are arranged in a matrix on a substrate. The driver 120 includes a scan driver that transmits a scan signal to a scan line connected to the pixels P, and a data driver that transmits a data signal to a data line connected to the pixels P. The driver 120 is disposed on a non-display portion of the substrate around the display portion 110 that includes the pixels P. The driver 120 may be an integrated circuit chip and may be directly mounted on the substrate on which the display portion 110 is formed, may be mounted on a flexible printed circuit film, may be attached as a tape carrier package (TCP) to the substrate, or may be directly formed on the substrate.

Figure 2:
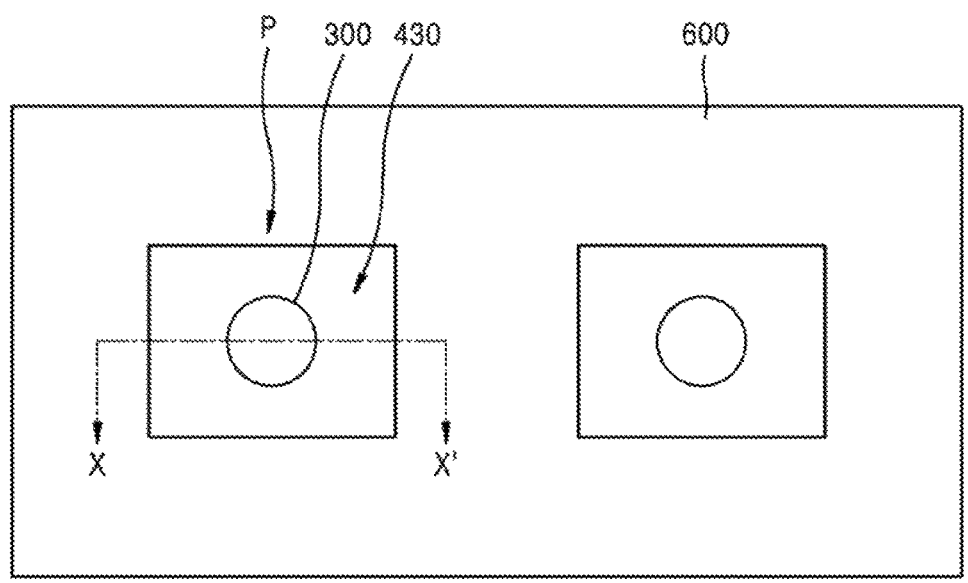
FIG. 2 is a schematic plan view of pixels of a display apparatus illustrated in FIG. 1.
Figure 3:
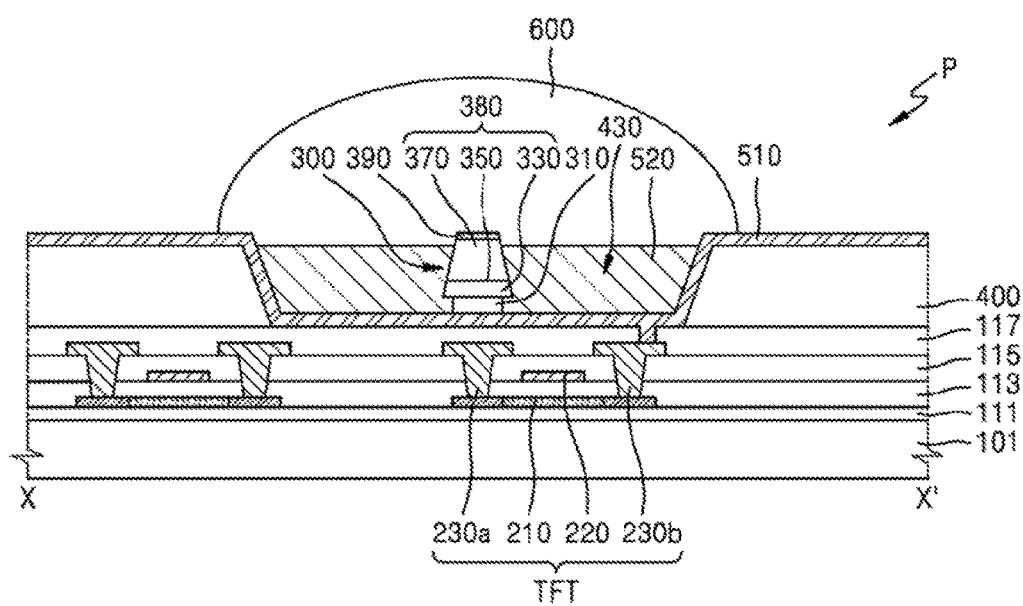
FIG. 3 is a cross-sectional view taken along line X-X' of FIG. 2.

FIG. 2 is a schematic plan view of the pixels P of the display apparatus 100 illustrated in FIG. 1. FIG. 3 is a cross-sectional view taken along line X-X' of FIG. 2.

Referring to FIGS. 2 and 3 together, according to an embodiment, each pixel P includes a light-emitting diode (LED) 300 and a pixel circuit connected to the LED 300. The pixel circuit includes at least one transistor (TFT) and at least one capacitor. The pixel circuit is connected to the scan line and the data line that cross each other. FIG. 3 illustrates an example in which one of two TFTs is connected to one LED 300.

According to an embodiment, a substrate 101 includes any of various materials. For example, the substrate 101 may be formed of a transparent glass material having $SiO_2$ as a main component. However, the substrate 101 is not limited thereto, and in other embodiments may be formed of a transparent plastic material and may be flexible. The plastic material may be an insulating organic material selected from the group comprising polyethersulfone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), cellulose triacetate (TAC), and cellulose acetate propionate (CAP).

According to an embodiment, when the display apparatus 100 is a bottom emission display apparatus in which an image is formed toward the substrate 101, the substrate 101 should be formed of a transparent material. However, when the display apparatus 100 is a top emission display apparatus in which an image is formed away from the substrate 101, the substrate 101 need not be formed of a transparent material. In this case, the substrate 101 can be formed of metal.

According to an embodiment, when the substrate 101 is formed of metal, the substrate 101 includes at least one material selected from the group comprising, but not limited to, iron, chromium, manganese, nickel, titanium, molybdenum, stainless steel (SUS), an Invar alloy, an Inconel alloy, and a Kovar alloy.

According to an embodiment, a buffer layer 111 is formed on the substrate 101. The buffer layer 111 planarizes a top surface of the substrate 101 and can prevent impurities or moisture from penetrating into the substrate 101. For example, the buffer layer 111 may include an inorganic material such as silicon oxide, silicon nitride, silicon oxynitride, aluminum oxide, aluminum nitride, titanium oxide, or titanium nitride, or an organic material such as polyimide, polyester, or acryl, and may be formed by stacking a plurality of the materials.

According to an embodiment, the TFT and the LED 300 is disposed on the buffer layer 111.

According to an embodiment, the TFT includes an active layer 210, a gate electrode 220, a source electrode 230a, and a drain electrode 230b. The active layer 210 includes a semiconductor material and has a source region, a drain region, and a channel region between the source region and the drain region. The gate electrode 220 is formed over the active layer 210 and corresponds to the channel region. The source electrode 230a and the drain electrode 230b are electrically connected to the source region and the drain region of the active layer 210, respectively. A first insulating layer 113 formed of an inorganic insulating material is disposed as a gate insulating film between the active layer 210 and the gate electrode 220. A second insulating layer 115 is disposed as an interlayer insulating film between the gate electrode 220 and the source electrode 230a and between the gate electrode 220 and the drain electrode 230b. A third insulating layer 117 is disposed as a planarization film on the source electrode 230a and the drain electrode 230b. Each of the second insulating layer 115 and the third insulating layer 117 may be formed of an organic insulating material or an inorganic insulating material, and in some embodiments, may be formed by alternately disposing an organic insulating material and an inorganic insulating material.

Although the TFT is a top gate TFT in which the gate electrode 220 is disposed over the active layer 210 in FIG. 3, embodiments are not limited thereto, and the gate electrode 220 may be disposed below the active layer 210 in other embodiments.

According to an embodiment, a bank 400 for defining a pixel region may be disposed on the third insulating layer 117. The bank 400 includes a recessed portion 430 that can receive the LED 300. A height of the bank 400 can be determined by a height of the LED 300 and a viewing angle. A size (width) of the recessed portion 430 can be determined by the resolution or pixel density of the display apparatus 100. In an embodiment, the height of the LED 300 is greater than the height of the bank 400. Although the recessed portion 430 has a rectangular shape in FIG. 2, embodiments are not limited thereto, and the recessed portion 430 may have any of various other shapes, such as a polygonal shape, a circular shape, a conical shape, an elliptical shape, or a triangular shape.

According to an embodiment, a first electrode 510 is disposed along a side surface and a bottom surface of the recessed portion 430 and a top surface of the bank 400 around the recessed portion 430. The first electrode 510 can be electrically connected to the source electrode 230a or the drain electrode 230b of the TFT through a via hole formed in the third insulating layer 117. In FIG. 3, the first electrode 510 is electrically connected to the drain electrode 230b.

According to an embodiment, the bank 400 prevents mixing of light generated by adjacent LEDs 300 by acting as a light blocker that has a low light transmittance and blocking light discharged to a side surface of each LED 300. In addition, the bank 400 can increase an ambient contrast ratio of the display apparatus 100 by absorbing or blocking external light. The bank 400 may include a material that at least partially absorbs light, a light-reflecting material, or a light-scattering material.

According to an embodiment, the bank 400 includes an insulating material that is semi-transparent or opaque to visible light, i.e., light with a wavelength ranging from 380 nm to 750 nm. The bank 400 may be formed of, but is not limited to, a thermoplastic resin such as PC, PET, PES, polyvinyl butyral, polyphenylene ether, polyamide, PEI, norbornene-based resin, methacrylic resin, or cyclic polyolefin-based resin, a thermosetting resin such as epoxy resin, phenolic resin, urethane resin, acrylic resin, vinyl ester resin, imide-based resin, urethane-based resin, urea resin, or melamine resin, or an organic insulating material such as polystyrene, or polyacrylonitrile. The bank 400 may also be formed of, but is not limited to, an inorganic insulating material such as inorganic oxide or inorganic nitride, such as SiOx, SiNx, SiNxOy, AlOx, TiOx, TaOx, ZnOx, etc.

In an embodiment, the bank 400 is formed of an opaque material such as a black matrix material. Examples of an insulating black matrix material include an organic resin, a glass paste, a resin or paste including a black pigment, metallic particles, such as, nickel, aluminum, molybdenum, or an alloy thereof, metal oxide particles such as chromium oxide, and metal nitride particles such as chromium nitride. In another embodiment, the bank 400 may be a distributed Bragg reflector (DBR) having high reflectance or a mirror reflector formed of metal.

According to an embodiment, the LED 300 is disposed in the recessed portion 430 of the bank 400. The LED 300 is a micro-LED. The term "micro size" refers to a size ranging from 1 μm to 100 μm. However, embodiments are not limited thereto and may include an LED having a larger or smaller size. One LED 300 or a plurality of LEDs 300 may be picked up from a wafer by a feed mechanism and transferred to the substrate 101 and to be received in the recessed portion 430 of the substrate 101. In an embodiment, the LED 300 is received in the recessed portion 430 of the substrate 101 after the bank 400 and the first electrode 510 are formed. The LED 300 emits light with a predetermined wavelength in a wavelength range from ultraviolet (UV) light to visible light. For example, the LED 300 may be a red, green, blue, or a white LED, or a UV LED.

According to an embodiment, the LED 300 includes a p-n diode 380, a first contact electrode 310, and a second contact electrode 390. The first contact electrode 310 or the second contact electrode 390 include at least one layer and may be formed of any of various conductive materials, such as metals, conductive oxides, and conductive polymers. Each of the first contact electrode 310 and the second contact electrode 390 may selectively include a reflective layer, such as a silver layer. The first contact electrode 310 is electrically connected to the first electrode 510, and the second contact electrode 390 is electrically connected to a second electrode. The p-n diode 380 includes a lower p-doping layer 330, at least one quantum well layer 350, and an upper n-doping layer 370. In another embodiment, the upper doping layer 370 is a p-doping layer, and the lower doping layer 330 is an n-doping layer. The p-n diode 380 may have a straight side wall, or a side wall that tapers upward or downward.

According to an embodiment, the first electrode 510 is a reflective electrode and includes one or more layers. For example, the first electrode 510 may include a metal, such as aluminum, molybdenum, titanium, tungsten, silver, gold, or an alloy thereof. The first electrode 510 may include a transparent conductive layer that includes a conductive material, such as a transparent conductive oxide (TCO), such as ITO, IZO, ZnO, or $In_2O_3$, a carbon nanotube film, or a transparent conductive polymer, and a reflective layer. In an embodiment, the first electrode 510 has a triple layer structure that includes upper and lower transparent conductive layers and a reflective layer between the upper and lower transparent conductive layers.

According to an embodiment, the second electrode may be a transparent or semi-transparent electrode. For example, the second electrode is formed of a conductive material such as TCO, such as ITO, IZO, ZnO, or $In_2O_3$, a carbon nanotube film, or a transparent conductive polymer.

According to an embodiment, a passivation layer 520 surrounds the LED 300 in the recessed portion 300. The passivation layer 520 covers the bank 400 and the LED 300. The passivation layer 520 is formed to a height that does not cover the top of the LED 300, for example, the second contact electrode 390, and thus exposes the second contact electrode 390. The passivation layer 520 includes an organic insulating material. For example, the passivation layer 520 may be formed of, but not limited to, acryl, poly(methyl methacrylate) (PMMA), benzocyclobutene (BCB), polyimide, acrylate, epoxy, or polyester. The second electrode that is electrically connected to the exposed second contact electrode 390 of the LED 300 is formed on the passivation layer 520.

In addition, the display apparatus 100 according to a present embodiment furthers includes a capping layer 600 that covers the LED 300. The capping layer 600 is formed of a transparent polymer such as epoxy, silicon, or urethane. In an embodiment, the capping layer 600 includes an acryl-based resin, such as PMMA, polyhydroxyethylmethacrylate, or poly(cyclohexyl methacrylate), an allyl-based resin such as polydiethyleneglycol bisallylcarbonate or PC, one of a thermoplastic or thermosetting resins such as methacrylic resin, polyurethane-based resin, polyester-based resin, polyvinyl chloride-based resin, polyvinyl acetate-based resin, cellulose-based resin, polyamide-based resin, fluorine-based resin, polypropylene-based resin, or polystyrene-based resin, or a mixture material thereof.

According to an embodiment, the capping layer 600 is formed of a material having a refractive index n_lens greater than 1. A material used to form the capping layer 600 is selected so that the refractive index n_lens of the capping layer 600, a refractive index n_LED of the LED 300, and a refractive index n_air of air have a relationship of n_air<n_lens<n_LED. A difference in refractive index at an interface between the LED 300 and air is decreased by adding the capping layer 600, and thus, light loss from the LED 300 to air can be decreased.

According to an embodiment, each LED in the display apparatus 100 can emit a unique color. For example, the display apparatus 100 can include a pixel with an LED that emits red light, a pixel with an LED that emits green light, and a pixel with an LED that emits blue light, and in some embodiments, the display apparatus 100 may further include a pixel with an LED that emits white light. The LEDs respectively emit light at different wavelengths, and accordingly, a difference in light distribution may occur based on the wavelength of light. This may cause a shift of white light. In a display apparatus according to an embodiment, capping layers having different optical characteristics based on the wavelength of the emitted light can be used to decrease the white light shift.

Figure 4:
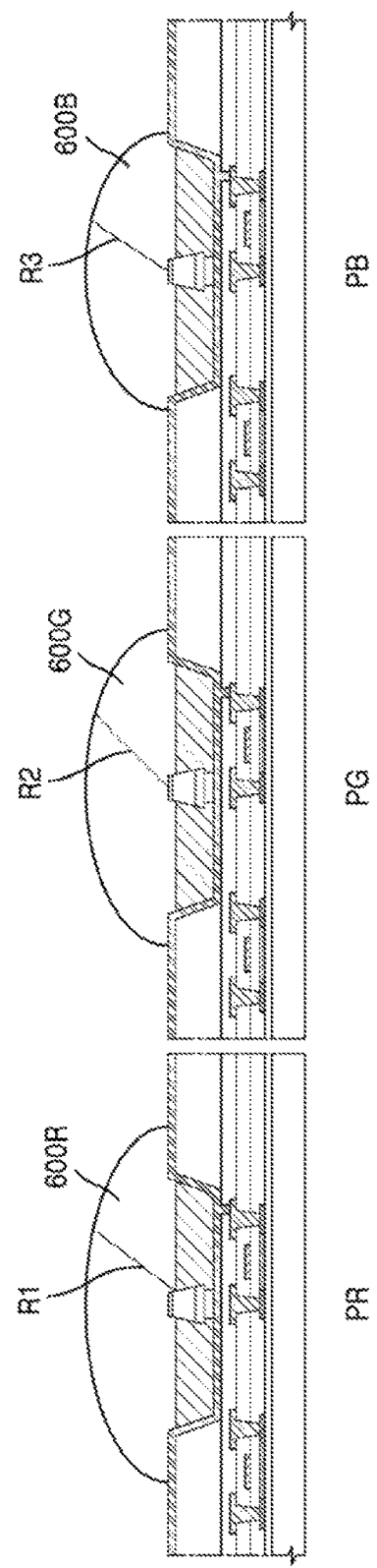
FIG. 4 schematically illustrates a display apparatus that includes capping layers having different optical characteristics for different wavelengths of light, according to an embodiment.

FIG. 4 schematically illustrates a display apparatus that includes first, second, and third capping layers 600R, 600G, and 600B having different optical characteristics based on the wavelength of light, according to an embodiment. As illustrated in FIG. 4, a display apparatus according to a present embodiment includes the first, second, and third capping layers 600R, 600G, and 600B having different radii of curvature based on the wavelength of the emitted light. For example, the display apparatus includes a red pixel PR that emits red light, a green pixel PG that emits green light, and a blue pixel PB that emits blue light. In addition, the red pixel PR of the display apparatus includes a first capping layer 600R having a first radius of curvature R1, a second capping layer 600G having a second radius of curvature R2, and a third capping layer 600B having a third radius of curvature R3.

According to embodiments, wavelengths correspond to greater angles of refraction at a boundary surface of a medium. Thus, capping layers having radii of curvature proportional to the wavelength can be disposed to decrease a difference of refractive indices between pixels. For example, since a wavelength of red light is longer than a wavelength of green light, the first radius of curvature R1 is greater than the second radius of curvature R2. In addition, since the wavelength of green light is longer than a wavelength of blue light, the second radius of curvature R2 is greater than the third radius of curvature R3.

Figure 5:
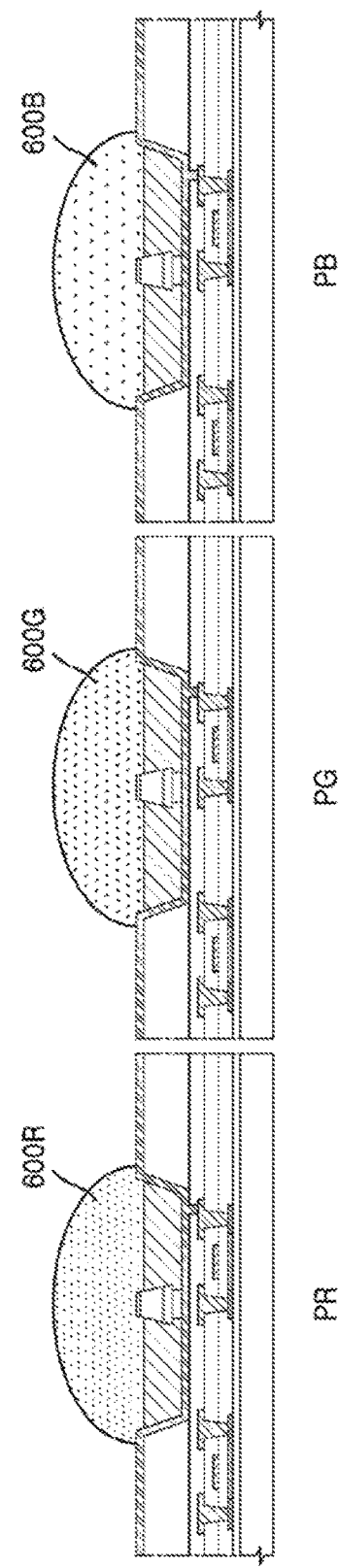
FIG. 5 schematically illustrates a display apparatus that includes capping layers having different optical characteristics for different wavelengths of light, according to another embodiment.

FIG. 5 schematically illustrates a display apparatus that includes first, second, and third capping layers 600R, 600G, and 600B having different optical characteristics for different wavelengths of light, according to another embodiment. As illustrated in FIG. 5, a display apparatus according to a present embodiment includes first, second, and third capping layers 600R, 600G, and 600B having haze values that differ based on the wavelength of the emitted light. For example, a display apparatus includes the first capping layer 600R disposed on a red LED that has a first haze value, the second capping layer 600G disposed on a green LED that has a second haze value, and the third capping layer 600B disposed on a blue LED that has a third haze value.

According to embodiments, shorter wavelengths of light correspond to more scattering in a capping layer. Thus, capping layers that have haze values proportional to the wavelength can be disposed to decrease differences in scattering between pixels. For example, since a wavelength of red light is longer than a wavelength of green light, the first haze value is greater than the second haze value. In addition, since the wavelength of green light is longer than a wavelength of blue light, the second haze value is greater than the third haze value. In this regard, radii of the capping layers may be identical, but embodiments are not limited thereto. Differences in light scattering between pixels can be decreased by using radii of curvature and haze values of the capping layers.

Figure 6:
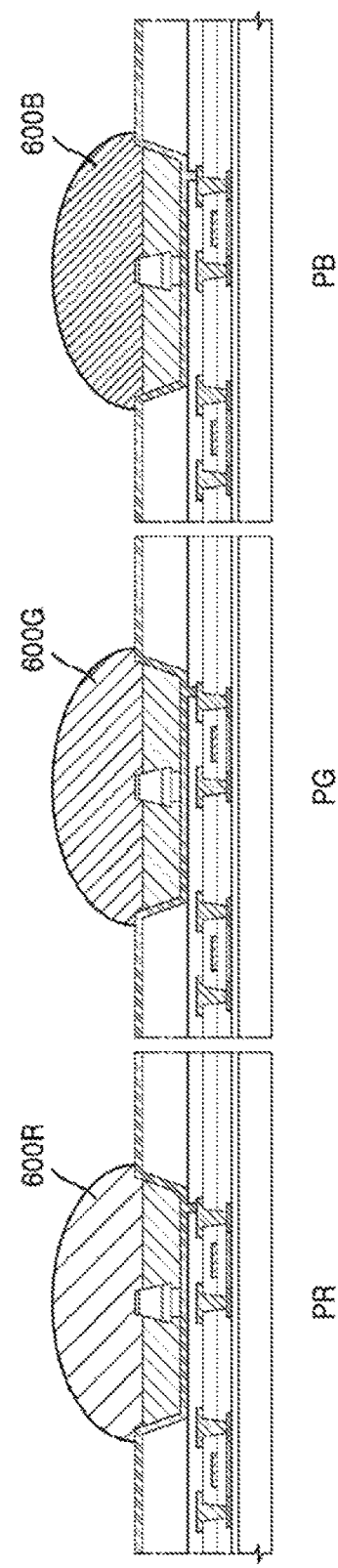
FIG. 6 schematically illustrates a display apparatus that includes capping layers having different optical characteristics for different wavelengths of light, according to another embodiment.

FIG. 6 schematically illustrates a display apparatus that includes first, second, and third capping layers 600R, 600G, and 600B having different optical characteristics for different wavelengths of light, according to another embodiment. As illustrated in FIG. 6, a display apparatus according to a present embodiment may include first, second, and third capping layers 600R, 600G, and 600B having different refractive indices for different wavelengths of emitted light. For example, the display apparatus include first capping layer 600R disposed on a red LED that has a first refractive index, second capping layer 600G disposed on a green LED that has a second refractive index, and third capping layer 600B disposed on a blue LED that has a third refractive index. Shorter wavelengths of light are associated with greater refraction in a capping layer. Thus, capping layers having refractive indices that are proportional to the wavelength can be disposed to decrease refraction differences between pixels. For example, since a wavelength of red light is longer than a wavelength of green light, the first refractive index is greater than the second refractive index. In addition, since the wavelength of green light is longer than a wavelength of blue light, the second refractive index is greater than the third refractive index. The capping layers can be determined using a combination of at least two of refractive indices, haze values, and radii of curvature.

Figure 7:
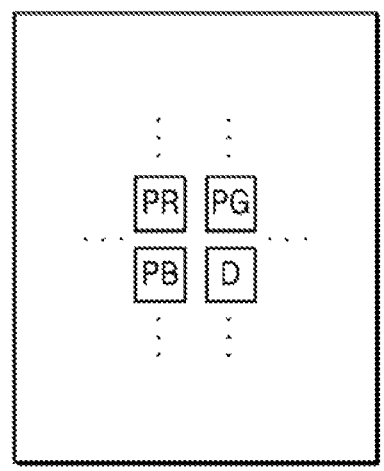
FIG. 7 illustrates a display apparatus that includes a photodetector that detects light, according to an embodiment.

A display apparatus according to a present embodiment further includes a detector that detects light emitted from an LED. FIG. 7 illustrates a display apparatus that includes a photodetector D that detects light, according to an embodiment. As illustrated in FIG. 7, the photodetector D may be disposed between pixels. A photodetector according to an embodiment is a photodiode and is disposed on a substrate where the pixels are formed.

Figure 8:
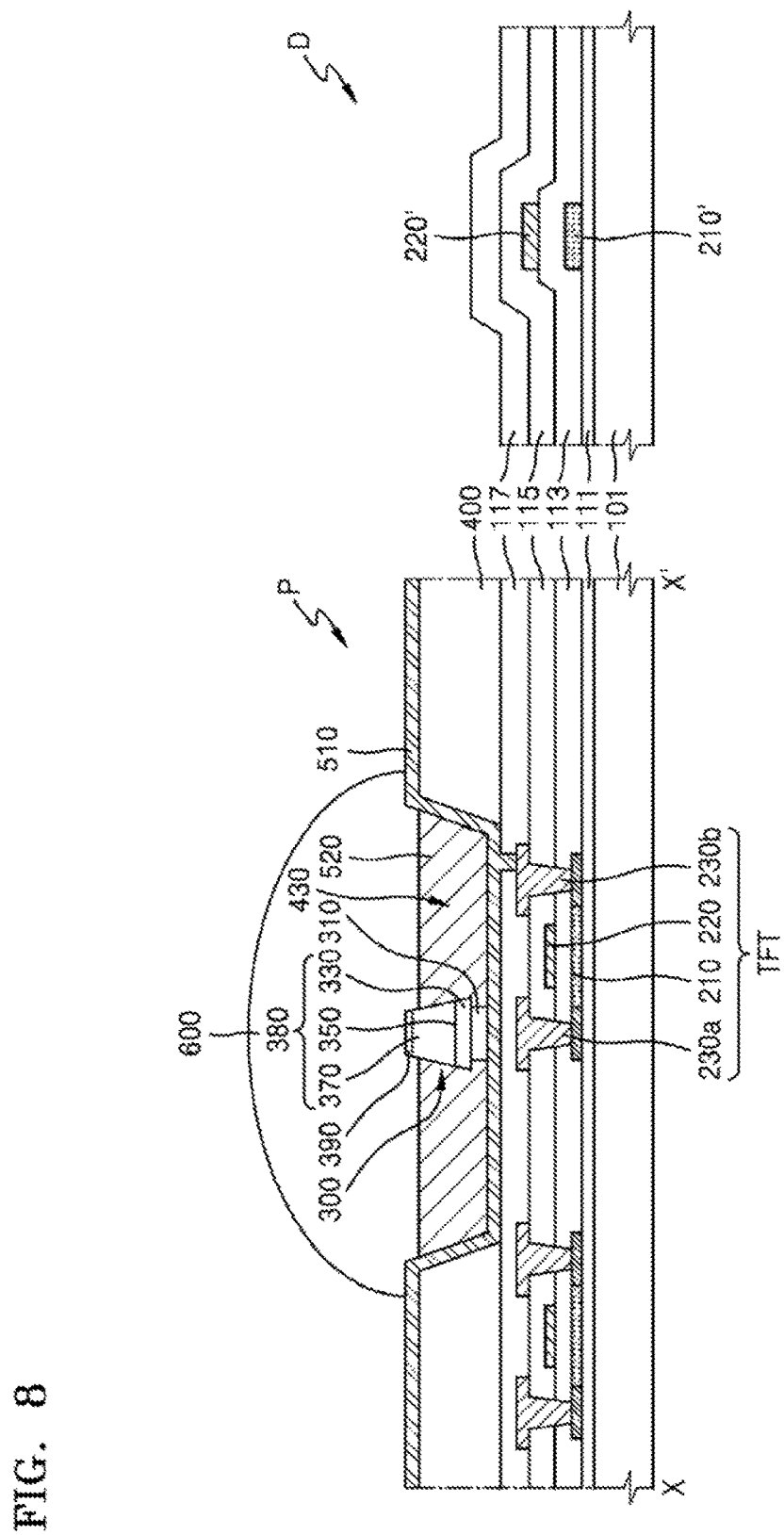
FIG. 8 is a cross-section of a display apparatus that includes a photodetector and a pixel, according to an embodiment.

FIG. 8 is a cross-section of a display apparatus that includes photodetector D and pixel P, according to an embodiment. Pixel P illustrated in FIG. 8 is the same as pixel P of FIG. 3, and accordingly, detailed descriptions thereof are omitted. Photodetector D is formed on a predetermined region of the buffer layer 111, and includes a semiconductor layer 210' on the same layer as that of the active layer 210 of the TFT and a gate electrode 220' on the same layer as that of the gate electrode 220 of pixel P.

Figure 9:
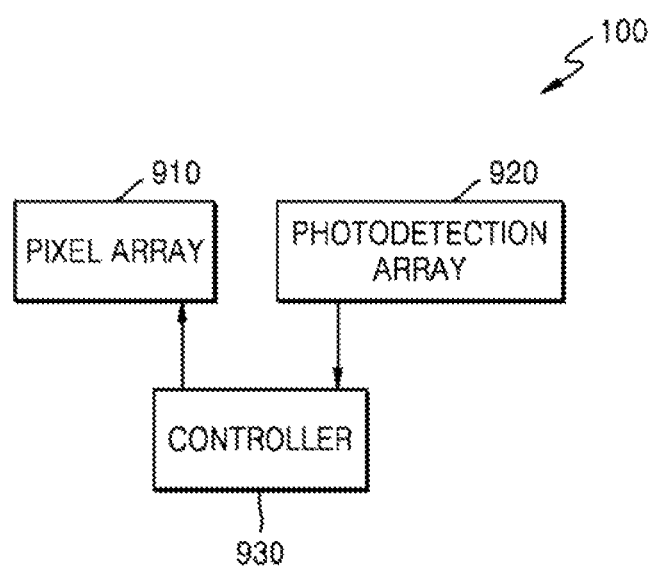
FIG. 9 is a block diagram of a display apparatus that can operate using a photodetection result, according to an embodiment.

FIG. 9 is a block diagram of the display apparatus 100 that can operate using a photodetection result, according to an embodiment. Referring to FIG. 9, the display apparatus 100 includes a pixel array 910 that includes a plurality of pixels that emit light, a photodetection array 920 that includes a photodetector D that detects emitted light, and a controller 930 that controls the display apparatus 100 using detected light.

According to an embodiment, the controller 930 can sense touch by a user, a fingerprint of the user, etc., by using a result detected by the photodetection array 920. In addition, the controller 930 controls an amount of light emitted by at least one pixel included in the pixel array 910 by using the detected result. In detail, the photodetector D can convert emitted light energy into an electric signal and output a current or voltage. When a current or voltage received from the photodetector D is greater or less than a reference value, the controller 930 controls a current or voltage that is applied to a certain pixel P.

For example, according to an embodiment, when it is determined that a voltage output from a blue LED is greater than a reference value, the controller 930 decreases a current or voltage that is applied to the blue LED. The controller 930 periodically receives a detection result from the photodetector D to correct an amount of light. For example, the controller 930 may receive a detection result from the photodetector D every week, whenever the display apparatus 100 is turned on, or whenever a command by the user is input.

Figure 10:
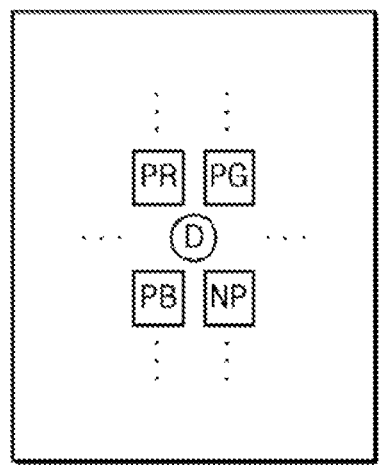
FIG. 10 illustrates a display apparatus that further includes an emission unit that emits infrared light.

The display apparatus 100 according to a present embodiment further includes an emission unit that emits infrared light. FIG. 10 illustrates a display apparatus that further includes an infrared emission unit that emits infrared light, in addition to the photodetector D. A structure of the infrared emission unit NP is substantially similar that of the above-described pixel P, except that the structure of the infrared emission unit NP emits infrared light. That is, the LED 300 is formed of a material that emits infrared light.

According to an embodiment, the infrared emission unit NP may be used to sense touch by a user, veins of the user, fingerprints of the user, etc. For more accurate sensing, light that is emitted from the infrared emission unit NP may be required to propagate in a straight line. Accordingly, optical characteristics of a capping layer disposed on the infrared emission unit NP differ from those of a capping layer disposed in a pixel P.

Figure 11:
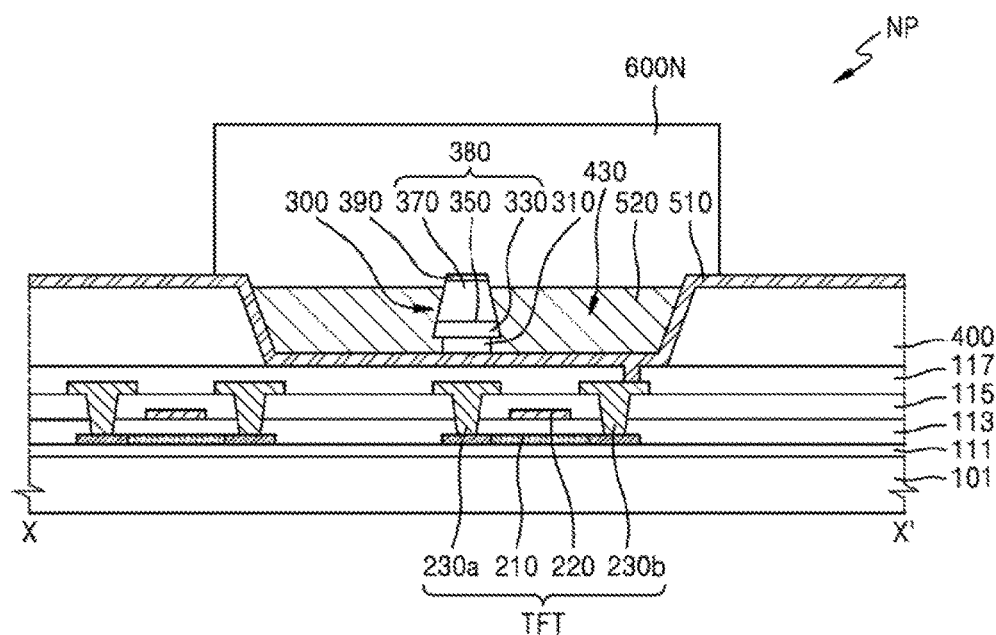
FIG. 11 is a cross-section of an infrared emission unit according to an embodiment.

FIG. 11 illustrates a cross-section of an infrared emission unit NP according to an embodiment. A structure of the infrared emission unit NP is substantially similar to that of the pixel P, except for a capping layer 600N. In addition, a material of an active layer 380 of the infrared emission unit NP differs from that of the active layer 380 of the pixel P. The capping layer 600N of the infrared emission unit NP has a cylindrical shape with a flat upper surface so that emitted light is not deflected. For example, the capping layer 600N has a stacked structure of layers that differ from each other. Thus, only vertically incident light emitted from the active layer 380 propagate out. Although an infrared emission unit has been described, embodiments of the present disclosure are not limited thereto. The display apparatus may emit light having a different wavelength, instead of visible light.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A display apparatus comprising:
a substrate;
a first light-emitting diode (LED) disposed on the substrate that emits a first light;
a second LED disposed on the substrate that emits a second light;
a first capping layer disposed on the first LED; and
a second capping layer disposed on the second LED that has optical characteristics that differ from those of the first capping layer,
wherein a haze value of the first capping layer differs from a haze value of the second capping layer, wherein, when a wavelength of the first light is longer than that of the second light, the haze value of the first capping layer is greater than the haze value of the second capping layer.

2. The display apparatus of claim 1, wherein a material of the first capping layer differs from a material of the second capping layer.

3. The display apparatus of claim 1, wherein a refractive index of the first capping layer differs from a refractive index of the second capping layer, wherein, when a wavelength of the first light is longer than that of the second light, the refractive index of the first capping layer is greater than the refractive index of the second capping layer.

4. The display apparatus of claim 1, wherein one of the first capping layer and the second capping layer has a lens shape, and the other has a cylindrical shape.

5. The display apparatus of claim 1, wherein the first light has a different wavelength from the second light.

6. A display apparatus comprising:
a substrate;
a first light-emitting diode (LED) disposed on the substrate that emits a first light;
a second LED disposed on the substrate that emits a second light;
a first capping layer disposed on the first LED; and
a second capping layer disposed on the second LED that has optical characteristics that differ from those of the first capping layer,
wherein the first capping layer and the second capping layer have lens shapes, and a radius of curvature of the first capping layer differs from a radius of curvature of the second capping layer, wherein, when a wavelength of the first light is longer than that of the second light, the radius of curvature of the first capping layer is greater than the radius of curvature of the second capping layer.

7. A display apparatus comprising:
a substrate;
a first light-emitting diode (LED) disposed on the substrate that emits a first light;
a second LED disposed on the substrate that emits a second light;
a first capping layer disposed on the first LED; and a second capping layer disposed on the second LED that has optical characteristics that differ from those of the first capping layer,
wherein the first light is visible light, and the second light is infrared light.

8. The display apparatus of claim 7, wherein the second capping layer is made of a different material than the first capping layer.

9. The display apparatus of claim 7, wherein a shape of the second capping layer is different from that of the first capping layer.

10. A display apparatus comprising:
a substrate;
a first light-emitting diode (LED) disposed on the substrate that emits a first light;
a second LED disposed on the substrate that emits a second light;
a first capping layer disposed on the first LED;
a second capping layer disposed on the second LED that has optical characteristics that differ from those of the first capping layer; and
a photodetector disposed on the substrate between the first LED and the second LED that detects at least one selected from the first light and the second light.

11. The display apparatus of claim 10, further comprising a controller that controls an amount of light emitted from at least one of the first and second LEDs based on a result received from the photodetector.

12. The display apparatus of claim 10, further comprising a controller that senses at least one of a touch by a user, a fingerprint of the user, and veins of the user, by using a result received from the photodetector.

13. The display apparatus of claim 10, wherein the photodetector comprises a photodiode.

14. A display apparatus comprising:
a substrate;
a plurality of light-emitting diodes (LED) disposed in a matrix on the substrate, wherein each LED emits one of a first light having a first wavelength, a second light having a second wavelength, and a third light having a third wavelength, where the first wavelength is less than the second wavelength, and the second wavelength is less than the third wavelength; and
a plurality of capping layers, wherein a capping layer is disposed on each LED and the capping layers have different optical characteristics for each of the first, second and third light,
wherein each capping layer has a haze value, and the haze value for an LED emitting a longer wavelength light is greater than the haze value for an LED emitting a shorter wavelength light.

15. The display apparatus of claim 14, wherein each capping layer has a refractive index, and the refractive index for an LED emitting a longer wavelength light is greater than the refractive index for an LED emitting a shorter wavelength light.

16. A display apparatus comprising:
a substrate;
a plurality of light-emitting diodes (LED) disposed in a matrix on the substrate, wherein each LED emits one of a first light having a first wavelength, a second light having a second wavelength, and a third light having a third wavelength, where the first wavelength is less than the second wavelength, and the second wavelength is less than the third wavelength; and
a plurality of capping layers, wherein a capping layer is disposed on each LED and the capping layers have different optical characteristics for each of the first, second and third light,
wherein each capping layer has a lens shape, and a radius of curvature for an LED emitting a longer wavelength light is greater than the radius of curvature for an LED emitting a shorter wavelength light.

17. A display apparatus comprising:
a substrate;
a plurality of light-emitting diodes (LED) disposed in a matrix on the substrate, wherein each LED emits one of a first light having a first wavelength, a second light having a second wavelength, and a third light having a third wavelength, where the first wavelength is less than the second wavelength, and the second wavelength is less than the third wavelength; and
a plurality of capping layers, wherein a capping layer is disposed on each LED and the capping layers have different optical characteristics for each of the first, second and third light,
wherein at least one of the plurality of LED emits infrared light, and the capping layer for an LED that emits infrared light is made of a different material than the capping layers for LEDs that emit one of the first, second and third light, and has a cylindrical shape with a flat upper surface.

18. A display apparatus comprising:
a substrate;
a plurality of light-emitting diodes (LED) disposed in a matrix on the substrate, wherein each LED emits one of a first light having a first wavelength, a second light having a second wavelength, and a third light having a third wavelength, where the first wavelength is less than the second wavelength, and the second wavelength is less than the third wavelength;
a plurality of capping layers, wherein a capping layer is disposed on each LED and the capping layers have different optical characteristics for each of the first, second and third light; and
a photodetector disposed on the substrate among the plurality of LEDs arranged in a matrix that detects at least one selected from the first light, the second light, and the third light, and a controller that controls an amount of light emitted from at least one of the plurality of LEDs based on a result received from the photodetector.

19. The display apparatus of claim 18, wherein the photodetector comprises a photodiode.

20. The display apparatus of claim 18, further comprising a controller that senses at least one of a touch by a user, a fingerprint of the user, and veins of the user, by using a result received from the photodetector.

* * * * *